(12) United States Patent
Wei

(10) Patent No.: US 7,480,205 B2
(45) Date of Patent: Jan. 20, 2009

(54) 3D FAST FAULT RESTORATION

(75) Inventor: Kaihong Wei, Pearland, TX (US)

(73) Assignee: Landmark Graphics Corporation, Houston, TX (US)

( * ) Notice: Subject to any disclaimer, the term of this patent is extended or adjusted under 35 U.S.C. 154(b) by 225 days.

(21) Appl. No.: 11/406,625

(22) Filed: Apr. 19, 2006

(65) Prior Publication Data

US 2006/0253759 A1    Nov. 9, 2006

Related U.S. Application Data

(60) Provisional application No. 60/673,263, filed on Apr. 20, 2005.

(51) Int. Cl.
*G01V 1/30* (2006.01)

(52) U.S. Cl. .............................. 367/37; 702/15; 702/16

(58) Field of Classification Search ............... 367/37; 702/15, 16
See application file for complete search history.

(56) References Cited

U.S. PATENT DOCUMENTS 5,048,552 A * 9/1991 Bourne ...................... 137/39

7,415,398 B2 * 8/2008 Naito et al. ...................... 703/6

FOREIGN PATENT DOCUMENTS

WO    2004/038654 A2    5/2004

OTHER PUBLICATIONS

Cai et al. Numerical Simulation of Dynamic Process of the Tangshan Earthquake by a New Method-LDDA. Pure appl. geophys. 157 (2000) 2083-2104.*
Irschik et al. Dynamic Green's Function Method Appled to Vibrations of Piezoelectric Shells. 1st International Proceedings. Control of Oscillations and Chaos 1997. vol. 3. Aug. 27-29, 1997, pp. 381-383.*
Iizuka et al. Parallel Simulation System for Earthquake generation: fault analysis modules and parallel coupling analysis. Concurrency and Computation: Practice and Experience. 14:499-519. 2002.*

(Continued)

*Primary Examiner*—Jack W Keith
*Assistant Examiner*—Ari M Diacou
(74) *Attorney, Agent, or Firm*—Meyertons Hood Kivlin Kowert & Goetzel, P.C.; Jeffrey C. Hood; Mark K. Brightwell

(57) ABSTRACT

Solutions to the problem of reversing seismic fault movements are formulated using a model based on elasticity theory, and using finite element and boundary element methods for generating a solution. The solution involves defining slip vectors from known formations in the fault and applying a space constraint restriction to traction values on the fault surface. The method may be applied in either 2D or 3D applications. The method is computationally fast enough to allow interactive fault reversal, and permits experimentation with various unfaulting scenarios so that a geologically acceptable solution is provided.

26 Claims, 7 Drawing Sheets

OTHER PUBLICATIONS

S. M. Clarke, S. D. Burley, G. D. Williams, A. 1. Richards, D. J. Meredith, and S. S. Egan. Integrated four-dimensional modelling of sedimentary basin architecture and hydrocarbon migration. Geological Society, London, Special Publications, Jan. 1, 2006; 253(1): 185-211.*

Tinti, E., P. Spudich, and M. Cocco (2005), Earthquake frachlre energy inferred from kinematic rupture models on extended faults, J. Geophys. Res., 110, B 12303, doi: I0.1029/2005JB003644.*

Rouby, Delphine, Xiao, Hongbin, Suppe, John. 3-D Restoration of Complexly Folded and Faulted Surfaces Using Multiple Unfolding Mechanisms. AAPG Bulletin 2000 84: 805-829.*

D. J. Meredith, G. D. Williams, J. E. Leonard: Integrated 4D Structural Restoration and Basin Modelling. (30 Minute Talk—Abstract included) AAPG Annual Meeting 2003: Energy—Our Monumental Task. Friday, May 9, 2003—Wednesday, May 14, 2003 | Salt Lake City, Utah. http://aapg.confex.com/aapg/sl2003/techprogram/paper_79166.htm.*

Santi, M.R.; Campos, J.L.E.; Martha, L.F. 3D Geological Restoration using a Finite Element Approach. Proceedings of 23rd GOCAD Meeting 2003, Nancy, France, Jun. 2003, pp. 1-12. http://www.tecgraf.puc-rio.br/publications/artigo_2003_3d_geological_restoration.pdf.*

Dimitris L. Karabalis, Non-singular time domain BEM with applications to 3D inertial soil-structure interaction, Soil Dynamics and Earthquake Engineeringvol. 24, Issue 3, Apr. 2004, pp. 281-293. (http://www.sciencedirect.com/science/article/B4V4Y-4BRKW17-9/1/957f4d5549e117dc155c7c23598083c7).*

David Meredith, Graham Williams, Jay Leonard, Andrew Richards. Struct3D—Automated Structural Restoration. http://www.force.org/PDW-Seminars/structuralgeology/presentations/PRA/Automated Structural Restoration.ppt. Dated by the Wayback Machine to Apr. 13, 2005.*

International Search Report and Written Opinion for application No. PCT/US2006/015535 mailed Aug. 24, 2006.

X. Yuzhong, Z. Jichang, F. Tailiang, C. Zhong, J. Chunming and Z. Lihui; "The Fracture Netowrk Model of Shen 229 Block Buried Hill: A Case Study From the Liaohe Basin, China"; Asia Pacific Oil and Gas Conference and Exhibition; Apr. 2005; 6 pages; Society of Petroleum Engineers Inc.

Karen S. Hoffman and John W. Neave; "Horizon Modeling Using a Three-Dimensional Fault Restoration Technique"; SPE Annual Technical Conference and Exhibition; Oct. 1999; 8 pages; Society of Petroleum Engineers Inc.

Paul R. La Pointe and Jan Hermanson; "The Geomechanical Prediction of Fracturing in the Circle Ridge Field, Wind River Basin, WY."; SPE/ISRM Rock Mechanics Conference; Oct. 2002; 13 pages; Society of Petroleum Engineers Inc.

* cited by examiner

3D FAST FAULT RESTORATION

PRIORITY CLAIM

This application claims the benefit of priority under 35 U.S.C. §119(e) to U.S. Provisional Application No. 60/673,263, filed on Apr. 20, 2005, entitled "Fast Elasticity Modeling and Numerical Solutions of Seismic Un-Faulting", invented by Kaihong Wei.

BACKGROUND OF THE INVENTION

1. Field of the Invention

This invention relates generally to the field of seismic interpretation, and more particularly, to modeling the restoration of a seismic fault.

2. Description of the Related Art

Faults in the crust of the earth cut through the sedimentary strata and offset them. Consequently, the seismic features in a 3D seismic dataset are often broken at faults. Seismic interpreters often struggle to correctly correlate features in a formation resulting from seismic events across a fault. A seismic fault can distort the depositional characteristics of a formation and even obscure hydrocarbon reservoirs that may be present and recoverable. Therefore, a way to image seismic formations that effectively compensates in reverse for fault movement is highly desirable. An advantageous result of such a method would provide a representation of the seismic formation that is restored to the pre-faulting state. Such a virtual reversal, or restoration, of a fault line may also reveal characteristics of the geological deposition and aid in identifying and locating hydrocarbon reservoirs. Thus 3D fault restoration involves removing the offset of seismic features in a 3D volume in order to facilitate the study of faulting sequences and in result, analyzing pre-faulting depositional environments.

The throw of a fault at the crossing of an event (e.g., an interpreted horizon) may be defined as the offset introduced into that event (in cross section) by the fault. Such an offset defines a slip vector at that point on the fault face. Event offsets may differ along the fault face; i.e., the slip vectors are not constant. Reversing a fault in general requires, therefore, the calculation of slip vectors at several events in the cross section.

Fault faces and the borders of a cross-section define the boundary of a mechanical continuum. When a load, in terms of traction or displacement (slip) vector, is applied to the boundary such as a fault surface, each point in the continuum will be displaced. The continuum will be deformed. Elasticity theory states that at equilibrium under loading, the total strain energy of the deformed region is—among all possible deformation for the given load—at a minimum. Or, equivalently, the theory states that the virtual work done by any admissible deformation is zero.

Rutten (Rutten, Kees, The Slokkert Validator Documentation, Landmark Graphics Internal Technical Communication, 2002) presented an algorithm to solve the same problem of fault restoration. When a number of slip vectors on a fault trace were given to reverse faulting, Rutten used a piecewise linear function to define the slip function on the fault surface. The approach is known as the "slip-parallel deformation model" in structural geology. In that method, the vertical displacement is attenuated, moving away from the fault, by applying a simple decay function along a set of scan lines intersecting with the fault. The results of that approach, although they may appear visually reasonable in 2-D views, lack a mechanics-based foundation. Additionally, the dispersion formulation may be complicated in practice for 3-D cases.

Elasticity theory combined with finite element methods or boundary element methods have been used to study the mechanics of faulting process (see Wei, K. and De Bremaecker, J.-Cl., A Replacement for the Coulomb-Mohr Criterion, Geophysical Research Letters, 19, 1033-1036, 1992; Wei, K. and De Bremaecker, J.-Cl., Fracture Under Compression: The Direction of Fracture Initiation, International Journal of Fracture, 61, 267-294, 1993; Wei, K. and De Bremaecker, J.-Cl., Fracture Growth Under Compression, Journal of Geophysical Research, 99, 13871-13790, 1994; Wei, K. and De Bremaecker, J.-Cl., Fracture Growth-I. Formulations and Implementations, Geophysical Journal International, 122, 735-745, 1995; Wei, K. and De Bremaecker, J.-Cl., Fracture Growth-II. Case Studies, Geophysical Journal International, 122, 746-754, 1995). The focus of these studies was to understand the orientation of fault growth for a given loading. However, solving the problem of 3D fault restoration is not the same problem as understanding how a fault grows. Therefore, fault growth models are of limited significance in 3D fault restoration—even when the goal of the restoration is to provide a mechanically sound method.

The problem of restoring a fault line is not trivial to solve because a restoration must be obtained in a mechanically and geologically plausible manner. In other words, the restoration model for displacement on the fault surface (i.e., for reversing a faulting event) must provide for dispersing mechanical energy to other parts of the region in consistency with a coherent mechanical model. The model should generally be based on assumptions that are available for validation, although it must be remembered that the goal of the restoration is not a reverse modeling of the actual faulting event.

Additionally, it would be useful if such a restoration of a seismic fault could be performed in an interactive manner, such that numerous iterations of various parameters and assumptions could be tested in an economically feasible timeframe.

Furthermore, the desirable method should provide the ability to perform a transformation on fault data in 3D, at least because 3D solutions for fault restoration are closer to geological reality and provide more accurately restored structures than 2D restorations. For 3D fault reversal problems, existing methods (such as the displacement extrapolation with scan lines) are overly simplified and cannot handle the infinite combinations of the azimuth and dip of the fault surface. The applications of 3D fault restoration are basically the same as for 2D fault restorations (see Wei, K. and Maset, R., Fast Fault Reversal, Expanded Abstract of 75$^{th}$ Annual International Meeting, Society of Exploratory Geophysics, Expanded Abstracts, 24, 767-770, 2005), namely for validating the correlations of interpreted horizons, for studying the structural geology, and for interpreting pre-faulting stratigraphy. However, the advantage of a 3D restoration is that out-of-plane slip vectors can be appropriately taken into account. (Note that horizon is a term that refers to a sub-surface, usually is the top or bottom of a deposition layer, which was continuous before faulting. When a faulting occurred, a horizon was broken into two pieces on each side of the fault.)

An example of a prior art method illustrating a 2D restoration is shown in FIG. 1. The fault is represented by the slip between sections 101 and 103. A horizon is shown as layer 104. 2D plane 102 intersects the formation parallel to line A'A 108. The slip surfaces of the fault are given by 105 and 106. FIG. 1 illustrates, that even in this simple case, the out-of-plane slip vector of the faulting cannot be accurately accounted for by applying a 2D restoration, such as given by plane 102. Typical faults are vastly more complex than as shown in FIG. 1; thus a 2D restoration method is very limited in scope, and ergo usefulness.

Thus, for accurately restoring the state near a fault to conditions before the fault occurred, a 3D numerical method is required for performing the necessary calculations that is computationally efficient, and whose assumptions and models are mathematically and mechanically valid.

SUMMARY

Embodiments of the present invention address the foregoing requirements by formulating the deformation problem in 3D to numerically reverse the seismic faulting using an elasticity model, and then, numerically solving the deformation problem with a numerical method in 3D. Thus, one embodiment comprises an elastic physical model for formulating the problem and a numerical method for obtaining a solution. Therefore, a novel restoration solution that is mathematically and mechanically coherent is provided.

One embodiment uses an elasticity model as the unifying approach for both 2-D and 3-D coordinates, and in result, delivers a consistent solution for all cases. The physical model disperses the slip vector from the fault surface to other parts of the region in consistency with an elastic deformation model. This provides for the handling of faults in a complex geometry, and may easily be extended from 2-D to 3-D cases. One embodiment also comprises a special technique that solves the finite element equation and a boundary element equation in a very efficient manner such that the technique can be used in an iterative and interactive way. Thanks to the special numerical technique, the method may provide the computational performance necessary for interactive graphical operations. This enhanced computational performance allows users of the method to quickly and graphically experiment with many seismic scenarios while obtaining geologically consistent interpretations and images. Examples may be used to validate the method, and the underlying theory dictates minimal distortion of markers, such as seismic reflectors, within the restored volume sections.

The methods described herein may be applied to theoretical or measured seismic data sets and assumes that a known fault surface in a seismic formation does not change during the 3D restoration. The formulation of the problem is based on the well-known principle of virtual work (also known as the D'Alembert's-Lagrange principle and is equivalent to Newton's second law), which states that at equilibrium, the work done by any virtual displacement must be zero. In one embodiment, the virtual displacement is constrained along the surface of the fault, such that the deformation of the volume results in the minimum strain energy among all admissible deformations.

Once a formulation of the 3D restoration problem has been created, the problem may be solved to yield the 3D restoration solution. For solving the problem numerically, the method may decompose the boundaries of the faulting volumes into small elements of a simple geometry. The decomposition of the surface into small elements is performed in one embodiment of the present invention using elements corresponding to a general triangle, each of which comprises 3 vertices and a surface area.

Upon decomposition into small elements, the boundary integrals can be expressed as the sum of the integrals on these small elements. Furthermore, the displacement and traction functions on the small elements may be approximated with simple functions, such as linear functions. These simple functions may be parameterized with the displacement and traction value at the vertices of an element. In this manner, the integrals on an element become a linear combination of the displacement or traction value at the vertices. After assembling the integrals, a boundary element equation on the displacement and traction at the vertices of a boundary may be obtained. When certain restoration slip vectors are specified on the fault surface, the deformation of the volume can thus be solved with any prescribed traction on the other, non-fault boundaries. The remaining slip vectors on the fault surface are resolved in enforcement of a space constraint. A solution comprising the pre-faulting seismic state of an entire volume adjacent to a fault surface can thus be obtained.

The method may further apply a space constraint to the formation surfaces on each side of the fault surface, such that points on the surface model may not overlap each other as a result of the restoration. The space constraint, which may be enforced using a repulsive or attractive stress applied normal to the surface of an element, may be iteratively applied to generate an acceptable result within a minimal spatial tolerance.

The method thus may provide a numerical result that represents the un-faulted, i.e., 3D restored, state of the formation. Seismic events may be so restored to a pre-faulting state, and interpretation and stratigraphic analysis can then be carried out with great efficiency and high accuracy. The utility of the embodiments described herein may further extend to providing 3D restoration results in a form that may be readily used for display, storage, reporting, testing, assessments and further numerical analyses; for example, the results may be extremely useful for further simulation, modeling, or validation involving theoretic or experimental seismic data.

The foregoing has outlined rather broadly the features and technical advantages of embodiments of the present invention in order that the detailed description of the invention that follows may be better understood. Additional features and advantages will be described hereinafter, which form the subject of the claims of the invention.

BRIEF DESCRIPTION OF THE DRAWINGS

A better understanding of the present invention can be obtained when the detailed description presented herein is considered in conjunction with the following drawings in which.

Figure 1:
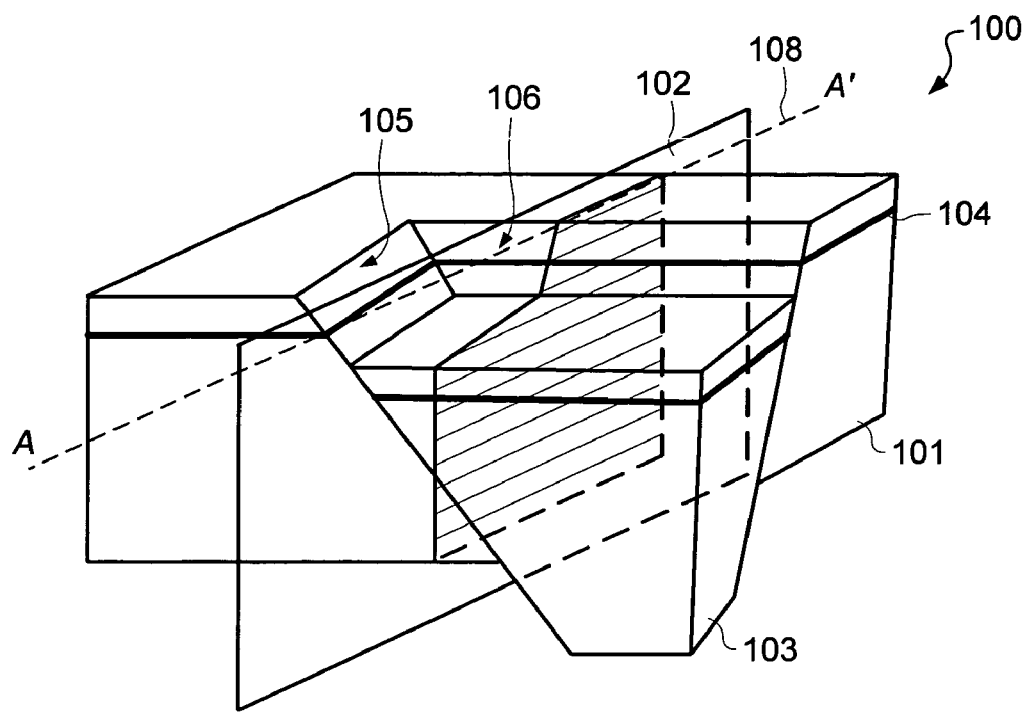
FIG. 1 illustrates an example of a prior art 2D restoration method.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

In the following description, numerous specific details are set forth such as specific reference algorithms to provide a thorough understanding of embodiments of the present invention. However, it will be obvious to those skilled in the art that embodiments of the present invention may be practiced without such specific details. In other instances, well-known mathematical method steps or components have been omitted or shown in block diagram form in order not to obscure the present description in unnecessary detail. For the most part, details concerning specific timing considerations and the like have been omitted inasmuch as such details are not necessary to obtain a complete understanding of the methods described herein and are within the skills of persons of ordinary skill in the relevant art.

One embodiment of the invention formulates the deformation problem to remove subsurface faulting fault with an elastic model and solves the deformation problem by a numerical method, such as a volume element or boundary surface element method. The method provides for computing the deformation due to the reversal of faulting on a section or a volume in a mechanically coherent manner. In one embodiment of the present invention described below, a boundary surface element method is used. Since the boundary surface element method generally requires fewer vertices than a volume element method for a given volume section, it can be generally expected to execute much faster than a volume element method. Embodiments may be practiced with a volume element method in alternate embodiments using essentially the same basic method steps as presented for the boundary surface method.

With a boundary element method, the fault surface divides a volume into two sections. A multiple subsection scheme is employed in cases where two sections are partially coupled if the fault does not entirely or completely cut through the volume. For each section, the boundary of the section is partitioned into surface elements, and a boundary integration equation may be established based on mathematical formulations of linear elasticity. The boundary equations may then be numerically solved for given slip or displacement vector on the fault surface, and the deformation solution to the fault reversal is obtained by a numerical integration over the boundary of each section. Note that the same fundamental integration equations are established for each section in 2D cases as those in 3D cases. By solving these integration equations numerically, embodiments of the present invention may obtain the deformation at any interior point of the volume. Thus the seismic events in the volume may be restored to a pre-faulting state.

Refer now to the drawings wherein depicted elements are not necessarily shown to scale and wherein like or similar elements are designated by the same reference numeral through the several views.

Figure 2:
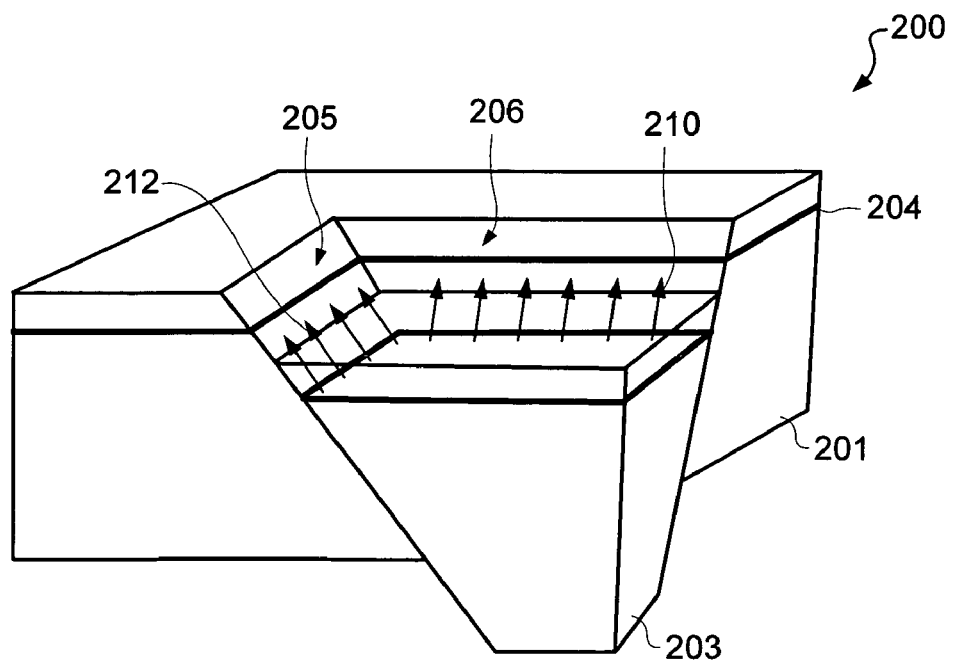
FIG. 2 illustrates restoration slip vectors in a 3D fault event in an embodiment of the present invention.

In FIG. 2, a simple model of a fault event 200 is illustrated in 3D. The fault event 200 comprises the slippage of a volume section 203 relative to another volume section 201. A horizon 204 has become discontinuous as a result of the slippage. In this simplified 3D model, the planes of the surfaces 205 and 206 define the fault. The restoration slip vectors, which indicate the displacement required to restore the fault on the fault surface are shown by vectors 212 for surface 205, and by vectors 210 for surface 206. The vectors 212 and 210 may be defined from the discontinuity of the horizon 204, and used as inputs, i.e., known quantities, for solving the formal numerical equation (see Equation (3)). Even in this simple 3D model, the inadequacy of a model employing a 2D, i.e. planar, fault surface is easily recognized (refer to FIG. 1); a 2D fault surface cannot accurately account for the slip vectors in the formation, and will produce false results in a 3D restoration. However, the 3D fault surface methods will be equally accurate if the fault surface occurs only in 2D. Since, as a practical matter, most seismic fault surfaces may be assumed to occur in 3D, the methods presently disclosed are highly pertinent to realistic applications. Note that for the other parts of the fault surface, no restrictions for displacement other than the non-violation of the space constraint are applied.

Figure 3:
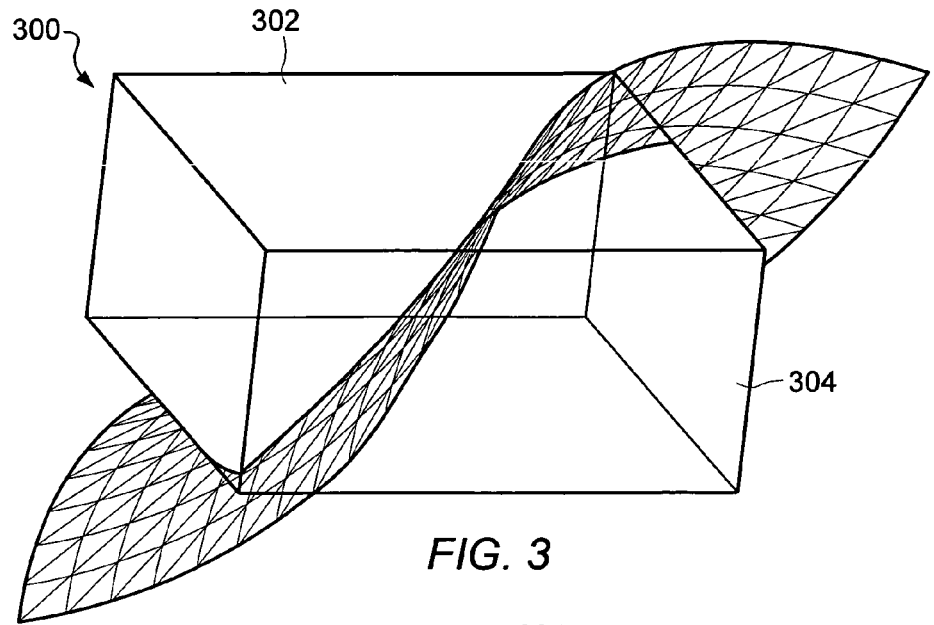
FIG. 3 illustrates a 3D fault surface in an embodiment of the present invention.

In FIG. 3, a model 300 of a volume intersected by a 3D fault surface is illustrated in 3D. The fault surface 306 divides the volume into sections, 304 and 302, on either side of surface 306. In other words, section 304 and section 302 contact each other along the fault surface 306. Faces or partial faces of the volume and the fault surface 306 bound each section 304, 302. For each of the two sections 304, 302, a boundary element model is applied to decompose the boundary into small elements of a simple geometry. In one example implementation, a standard triangulation algorithm decomposes the known fault surface into a plurality of general triangles. Such triangulation functions are well known in the art for finite element analysis, and may employ any one of numerous rules and/or methodologies for establishing a decomposition algorithm. One example of a triangulation method often used in finite element methods is the Delaunay triangulation, in which no point, i.e. vertex, lies inside the circumcircle (or in 3D, the circumsphere) of any other triangle. Other regular or irregular triangulation methods may alternatively be implemented in a similar manner in various implementations of the present invention.

When the two volumes on either side of the fault surface (for example, sections 304, 302 along surface 306) are displaced, such as during restoration, the contact boundaries may not overlap or penetrate each other, according to the presently disclosed methods. In other words, the contact boundaries are subject to a space constraint. A space constraint refers to fact that the two volumes must not penetrate each other. Since the two volumes contact each other along the fault surface, the constraint is imposed on the contact vertices of each volume (for example the vertices on surface 402 and surface 502). Repulsion is a traction or force per unit area, i.e., a stress, and it may be applied to the contact vertices to enforce the constraint. This represents a stress vector in the direction normal to the element (in the present example triangle) surface of a contact vertex and of a magnitude large enough to prevent an overlapping or an opening. In the direction of the normal vector at a contact vertex, the magnitude of the stress vector is positive or negative, arbitrarily for repulsion or attraction, and may be iteratively resolved until some minimum value satisfying the space constraint is converged upon. In some instances, the repulsion or attraction stress may be zero. The space constraint is a separate criteria for the 3D restoration results and is independent of decomposition geometry or other algorithms used in implementing various method steps.

Figure 4:
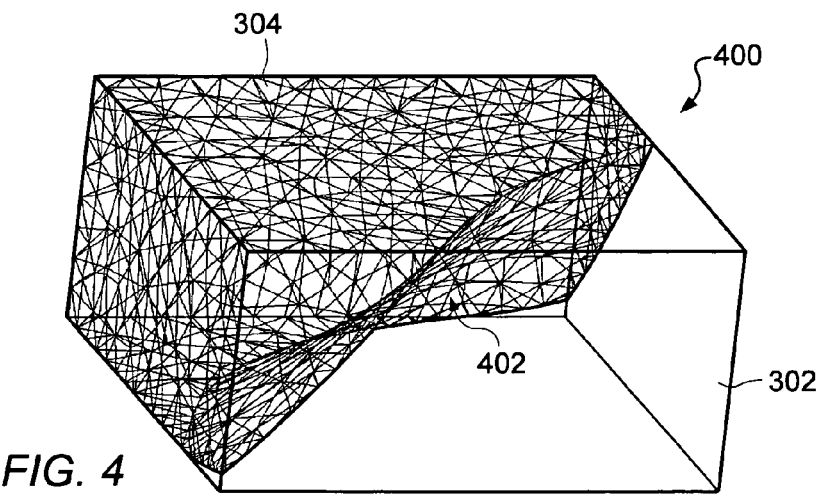
FIGS. 4 and 5 illustrate a finite element model of volumes on either side of a fault surface in an embodiment of the present invention.

In FIG. 4, a volume element 400 illustrates a triangulated boundary surface corresponding to section 304 (refer to FIG. 3). In volume element 400, surface 402 is the surface bounded by the fault surface 306 (not shown in FIG. 4). Similarly in FIG. 5, a volume element 500 illustrates a triangulated boundary surface corresponding to section 302 (refer to FIG. 3). In volume element 500, surface 502 is the surface bounded by the fault surface 306 (not shown in FIG. 5).

The examples presented describe application of an embodiment of the method of the present invention. In one example, corresponding to FIG. 2, a volume of 16×16×8 m³ is used. A fault, consisting of two planar surfaces, is introduced to the volume. The first planar surface dips 45 degrees W and strikes 0 degrees (i.e., N-S). The second planar surface dips 45 degrees SW and strikes N45W. In this example, a constant restoration slip vector is applied to every point on the first planar surface of the upper fault block. The restoration vectors have equal x- and z-components and zero y-component and represents sliding of the upper fault block against the fault surface. Note that the y-axis is parallel to the N-S compass direction and the z-axis is positive downward. The x-axis is perpendicular to the plane containing the directions of the x and z-axes. The restoration vectors are based on restoring a particular horizontal line on the fault surface, a line that represents the intersection of a horizontal horizon and the fault surface. Many points on the fault surface, but not those on the intersection, may be subject to an inequality constraint, and the repulsion method is used to enforce the constraint. The boundary of the fault blocks other than the fault surfaces are under a given traction in order to maintain equilibrium of forces involved. In this test, zero traction is used to simulate the case of no resistance to restoration. Where a portion of the fault is a planar surface, the deformation of the fault block consists only of space translation, resulting in no strain.

Figure 5:
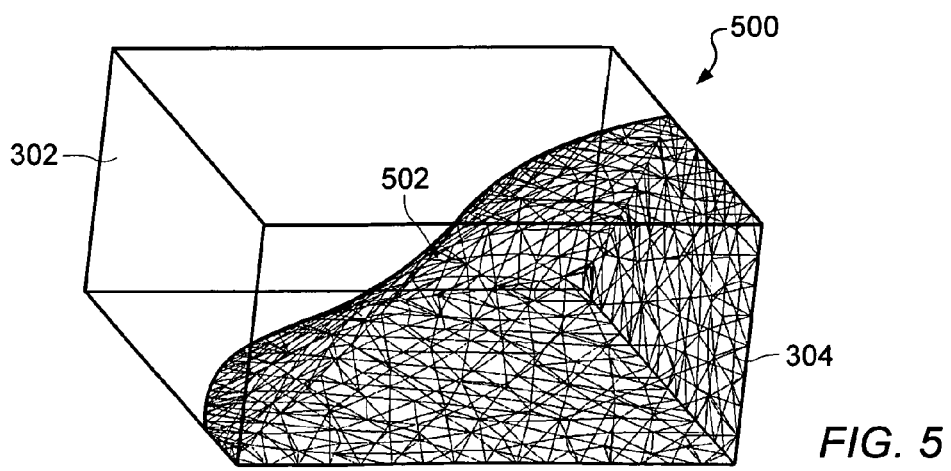

In another example, corresponding to FIGS. 3-5, the volume remains the same, and the fault is now a curved surface with opposite curvatures in two orthogonal directions. The strike and dip of the fault vary from vertex to vertex. Since the fault surface is curved, the restoration results in strain in the fault volume. FIG. 3 shows a graphical representation where the red surface is the fault surface. In FIG. 4, the fault surface of one section, the upper fault block, is exposed to the view, while the opposing section, the lower fault block, and the fault surface are made invisible. A few slip vectors may be graphically selected along a curved line on the fault surface. This curved line can be the intersection of a horizon with the fault surface. The restoration slip vectors are so chosen that the upper fault block will be restored to a higher position, and this fault block will remain in full contact with the fault surface. Note that the fault surface of the upper block is subject to the space constraint (i.e.; the repulsion method is applied), and the slip vector is defined at only a few locations. To enforce the space constraint, the repulsion scheme is applied in an iterative way. At any particular iteration, the penetration (or gap) of the vertices of elements under space constraint is computed, and an appropriate repulsion is applied to counter the space violation. An average violation is also computed, and the iteration stops when the average violation is less than a prescribed threshold. The following table shows the average space violation in m across the fault surface vertices for 16 iterations in one example method:

| 1 | 2 | 3 | 4 |
|---|---|---|---|
| 0.0252796 | 0.0129175 | 0.0115803 | 0.0105302 |
| 5 | 6 | 7 | 8 |
| 0.0096753 | 0.0089889 | 0.0084232 | 0.0079434 |

-continued

| 9 | 10 | 11 | 12 |
|---|---|---|---|
| 0.0075258 | 0.0071405 | 0.0068051 | 0.0065488 |
| 13 | 14 | 15 | 16 |
| 0.0063128 | 0.0060768 | 0.0058702 | 0.0056896 |

As one can see from the table, the penetration reduces from 0.0252796 m to 0.00568962 m after 16 iterations. The uniform convergence is a validating mathematic property of the repulsion algorithm.

Figure 6:
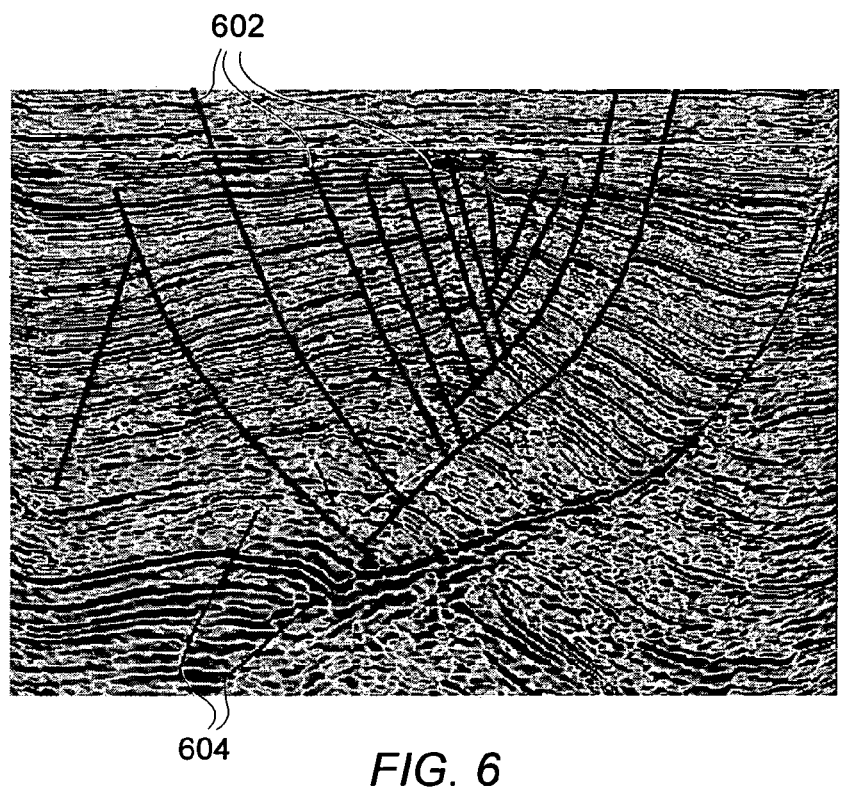
FIG. 6 is an image of a cross-section of a highly faulted formation.
Figure 7:
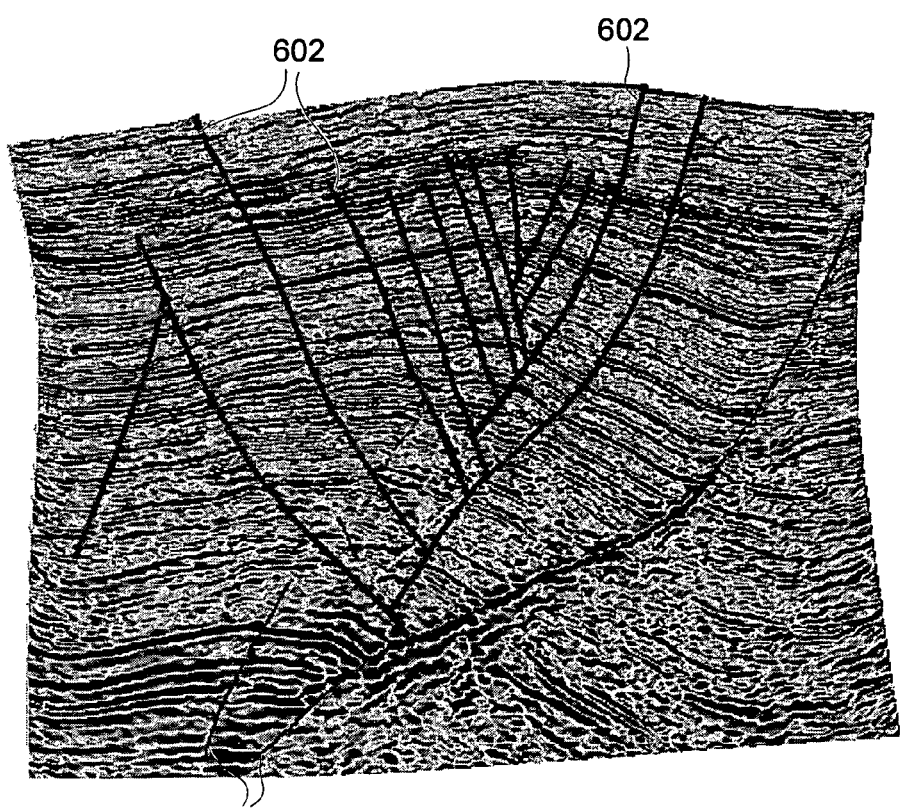
FIG. 7 is an image of a cross-section of a highly faulted formation restored in 3D in an embodiment of the present invention

In FIGS. 6 and 7, 2D images of a seismic formation, before and after applying methods of the present invention are illustrated. The images show a set of normal faults that have been identified, possibly around the top of an anticline fold. In FIG. 6, a seismic section showing horizons offset by a set of normal faults is shown. Faults 602 are involved in faulting reversal, and intersect horizons that are used as geological constraints. The elastic model in the formulation is characterized by a Young's modulus of about $3 \times 10^9$ Pa and a Poisson's ratio of 0.25. The formation is partitioned into a number of triangles, and a finite element method is used to solve the minimization problem for a given slip function on the fault trace. As shown in FIG. 7, the faulting reversal method was applied across 12 faults 602 by requiring that visible horizons be continuous across these faults. The offset of each horizon against a specific fault defines a slip vector. Piecewise linear functions based on these slip vectors were used to approximate the displacement fields on each of the respective faults. Note that several faults 604 were not restored. Note that some faults cut through the section. For those faults with two tips inside the section, the displacement is attenuated to zero at these tips. After applying elastic deformation, the deformed formation as shown in FIG. 7 resulted.

Figures 8, 9:
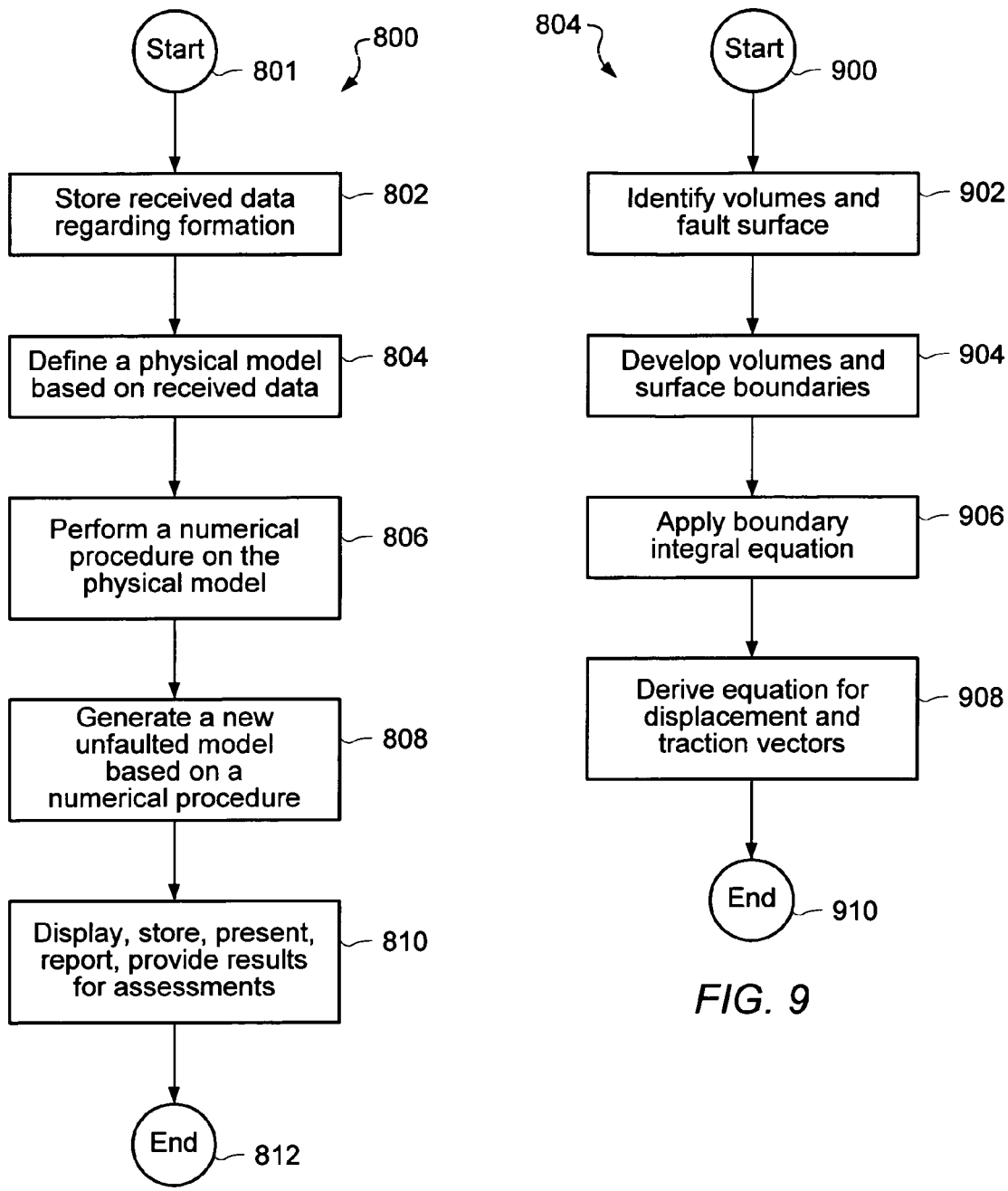
FIGS. 8-12 illustrate flowcharts of a method in an embodiment of the present invention.

FIGS. 8-12, flowcharts illustrate the methods in one embodiment of the present invention. The presently described methods may also be practiced in various other embodiments that omit or rearrange the method steps shown in FIGS. 8-12. In FIG. 8, method 800 shows the basic elements of the method, beginning with step 801. Seismic data regarding a formation are received in step 802. The seismic data may be in the form of images or numerical data that may be reduced to a structure of a volume of a formation. In one example of step 802, 3D seismic scan data of a formation containing one or more faults is provided.

The next method step 804 in FIG. 8 involves defining a physical model based on received data. In FIG. 9, one example of step 804 beginning with step 900 is shown in further detail. From the seismic data, the location of fault surfaces and location of horizons or other features in the formation is performed in step 902. Then in step 904, the volume and surface boundaries of the formation are decomposed, i.e., reduced to finite elements. In step 906, the boundary integral equation is derived and applied. In step 908, the equation for the displacement and traction vectors is derived from the boundary integral equation, which completes method 804 at step 910.

The method presently described assumes that the fault surface does not change for the purposes of 3D restoration. Since the goal of the present inventive methods is restoration to the un-faulted state, the actual behavior of the fault surface during the fault event is not particularly relevant. The results of embodiments of the present invention indicate that a 3D restoration that is mechanically coherent may be provided under the assumption of a fixed fault surface.

Figure 10:
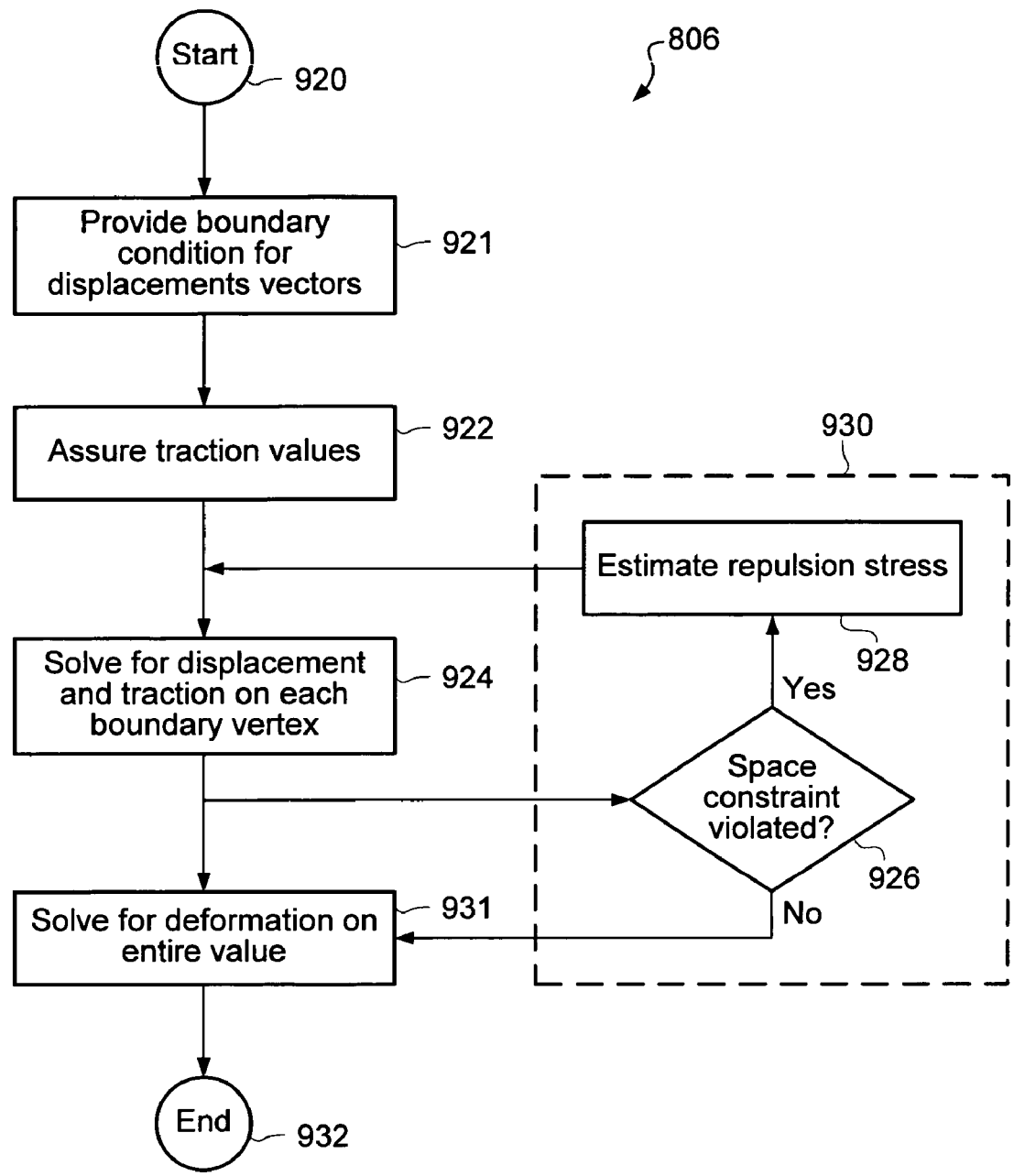

The next method step 806 in FIG. 8 involves performing a numerical procedure on the physical model. In FIG. 10, one example of step 806 beginning with step 920 is shown in further detail. In step 921, the boundary conditions for displacement vectors are provided. This may involve determining a slip restoration vector for a recognizable horizon split by a fault. In step 922, initial traction values for vertices on the fault surface are assumed. In step 924, the displacement and traction for each boundary vertex is resolved. From step 924, the method 806 may branch off to a portion 930, which represents an iterative solution for displacement and traction vectors on the fault surface. In step 926, the displacement vectors are checked to see if the space constraint is violated. If the space constraint is violated, then in step 928 new repulsion stresses are estimated. In one case, an incremental or decremental change to the previous repulsion stress values is applied in step 928. After step 928, step 924 is repeated, and the cycle given by 930 may continue until the result of step 926 is NO. If the space constraint is not violated by the given displacement and traction values, then step 926 proceeds to step 931, where the deformation of the entire volume may now be calculated, since all required quantities are known. The method 806 terminates at step 932.

Figure 11:
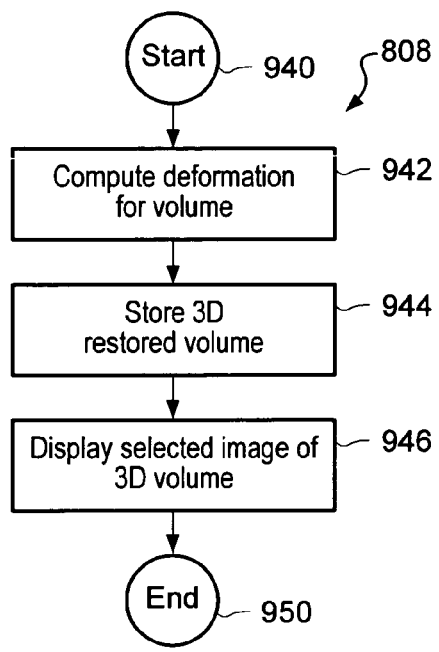

The next method step 808 in FIG. 8 involves generating a new unfaulted, i.e., restored, model of the formation based on a numerical procedure. In FIG. 11, one example of step 808 beginning with step 940 is shown in further detail. In step 942, the computed deformation from the restoration displacement vectors is applied to the original data. The resulting 3D restored volume is stored in step 944. In one example, the 3D volume is represented as one or more 2D slices or sections. In step 946 the resulting restored 3D volume may be displayed. In one example, the display involves generating any plane from the 3D volume and displaying this in 2D. In another example of step 946, the entire volume is displayed in 3D. In on embodiment of step 946 (not shown), a determination may also be made that the restoration was not accurate or deficient in some aspect, such that the method execution returned to step 920 and performed another iteration of method 806 with values correcting for the deficiency, and leaving other values unchanged. Method 808 terminates at step 950.

Figure 12:
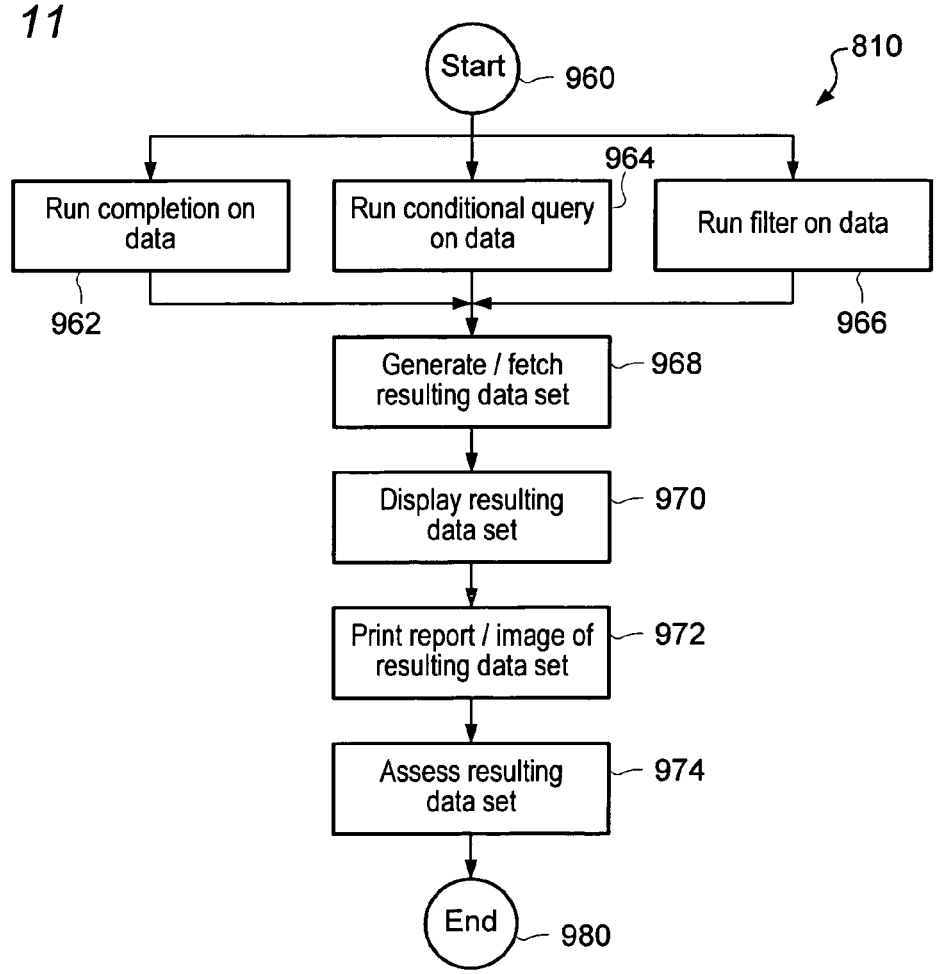

The next method step 810 in FIG. 8 involves the restored results may be stored, displayed, reported or used for further assessments. In FIG. 12, one example of step 810 beginning with step 960 is shown in further detail. Steps 962, 064 or 966 represent alternative paths for specifying a data set from the restored data. In step 962, a computation is executed on the restored data set, for example a scaling function. In step 964 a conditional query is performed to retrieve a portion of the restored data set. In step 966, a filtering or data reduction algorithm is applied to the restored data set. Note that steps 962-964 may be executed in a consecutive manner with omission or repeat of certain steps, and that other methods of specifying or altering the restored data set may be applied. In step 968, the resulting or retrieved data set may be stored or fetched, respectively. In one example, a query on a relational database is run in step 964 and the resulting query is fetched and stored in step 968. In step 970 the data set may be displayed in an analogous manner to step 946. In step 972, a report or image of the resulting data set may be generated. The report or image may be in 2D or 3D, in an analogous manner as for the display in step 946. In step 974 an method for assessing the resulting data set may be applied. In one example of step 974, the assessment is a manual analysis and comparison with other data sets. In another example of step 974, an algorithm is applied to the resulting data set. Other embodiments of step 974 may involve recognition of exploitable resources in the seismic formation, which were not apparent before the fault restoration.

One example implementation of a 3D restoration according to method 800 is now described in detail.

For given restoration slip vectors on fault surfaces, and given traction vectors on other parts of the volume boundaries, the deformation of the volume results in the minimum strain energy among all admissible deformations. An equivalent statement of this formulation is the well-known virtual work principle. This principle states that at equilibrium, the work done by any virtual displacement is zero. From the virtual work principle, the displacement vector at a point i in a volume can be computed from integrals of the displacement and traction vectors over the boundaries. By restriction to the points on the boundaries of the volume, one obtains a boundary integral equation.

Using Green's functions for virtual displacement and tractions, we may derive the a mathematical formulation from the virtual work principle. For each volume on either side of the fault service, such as sections 304 and 302, the following boundary integral equation applies:

$$c\vec{u}(p_i) = \sum_{e=1}^{E} \sum_{n=1}^{3} \vec{t}_n^e \int_{S_e} N_n(\xi) U(p_i, \xi) dS(\xi) - \sum_{e=1}^{E} \sum_{n=1}^{3} \vec{u}_n^e \int_{S_e} N_n(\xi) T(p_i, \xi) dS(\xi) \quad (1)$$

in equation (1) c is a constant; $\vec{u}(p_i)$ is the displacement vector for point $p_i$ in the volume enclosed by surface S (i.e., point $p_i$ may be defined by coordinates $(x_i, y_i, z_i)$ for index i); E is the total number of triangular surface elements indexed by e; n is the vertex index for a given triangular element; $\vec{t}_n^e$ and $\vec{u}_n^e$ are the traction and displacement vectors, respectively defined at the vertex n of element e; $S_e$ represents the surface of element e; $\xi$ represents the points on the surface of element e; $N_n$ is a base function associated with vertex n as a function of $\xi$; $U(p_i,\xi)$ is the kernel function for displacement; and $T(p_i,\xi)$ is the kernel function for traction. After assembling the integrals, one obtains a boundary element equation on the displacement and traction at the vertices of a boundary. The integrals in equation (1) can be evaluated using a standard numerical quadrature. The resulting equation is:

$$c\vec{u}_i = \sum_{e=1}^{E} \sum_{n=1}^{3} \vec{t}_n^e \Delta U_{ni} - \sum_{e=1}^{E} \sum_{n=1}^{3} \vec{u}_n^e \Delta T_{ni} \quad (2)$$

After reassembling, the following equation may be derived.

$$\sum_{i,j=0}^{N} A_{ij}\vec{u}_j = \sum_{i,j=0}^{N} B_{ij}\vec{t}_j \quad (3)$$

Note that in the system of equation (3) there are N equations on N displacement vectors and N traction vectors on the surface of a volume section. Furthermore, the displacement and traction functions on the small elements may be approximated with simple functions, such as linear functions. These simple functions are parameterized with the displacement and traction value at the vertices of the element. In equation (3), $A_{ij}$ is a matrix reassembled from $\Delta T_{ni}$ in equation (2), while $B_{ij}$ is a matrix reassembled from $\Delta U_{ni}$ of equation (2). In such a way, the boundary integrals on an element become a linear combination of the displacement or traction value at the vertices. If a boundary condition is given, the displacement or traction vector at each vertex of the boundary is resolved. If the number of known displacement or traction vectors equals to N, the problem is well defined, and the unknown displacement at each vertex can be obtained by solving equation (3).

By applying given slip vectors on the contact surface (such as surfaces 402 and 502) and some traction condition to other parts of the boundary (such as the remaining surfaces of sections 302 and 304), equation (3) can be solved for displacement and traction vectors at each vertex on the boundary. Once the displacement and traction at each vertex on the boundary is known, the deformation at any given interior point of the part can be then obtained by equation (2). In effect, this procedure removes the faulting and restores the volume to a pre-fault state.

The next step in the fault restoration is resolving the slip vectors on the fault surface. When a horizon is offset by a fault, the discontinuity of the horizon can be used for defining the restoration slip vectors (see FIG. 2, vectors 210, 212). In this way restoration slip vectors can be defined on the intersection of the horizon and the fault. The intersection defines a polyline on the faulting surface. Note that the displacement at the other points on the fault surface cannot be defined by the discontinuity of the horizon. The extrapolation of these same slip vectors to other vertices on the fault surface would erroneously result in penetration of the volume unless a correction is made.

In a fault restoration problem, input displacement vectors may be given for the contact boundary of one volume section, for example surface 402 for section 304, or surface 502 for section 302. In various example case, given displacement vectors may be supplied manually, i.e., by a user, or automatically by an analytical method, from a calibrated data set, such as a digital image, of the faulted seismic formation. In one embodiment, the input displacement vectors may result from an automated analysis method operating on a 3D data set representing a faulted formation. In one embodiment, an image analysis routine operating on a 2D image may vectorize the formations on either side of a fault line, detect a horizon discontinuity from the vectorized image, and automatically return a restoration slip vector (or at least the 2D planar component thereof) for each detected discontinuity; such a process may be repeated with several images of the formation, representing different sectional views, to assemble 3D representation of the input displacement vectors. In one manual implementation, the input displacement vectors may be manually chosen such that a feature on the contact surface of one section, such as the intersection of a horizon surface with the fault surface, will meet the commensurate horizon/fault intersection of the section on the other side of the fault surface. This kind of displacement vectors are generally referred to as slip vectors, a term common in structural geology. From the point view of structure, restoration, the main quandary is the removal of the discontinuity of the horizon due to the faulting. The elasticity model can compensate for other factors to produce a deformed volume characterized by minimum seismic distortion. The specification of restoration vectors at each vertex on the fault surface is not required, the space constraint provides the means to resolve the remaining quantities.

Note that the input slip vectors are only given at the locations of a recognizable feature on the contact surface, i.e. an intersection of a horizon with the fault surface. These locations normally follow a polyline (a line comprising multiple line segments) on the contact surface, such as the case of horizon-fault intersection. In the small element model, these locations correspond to the vertex of an element at the location. The orientation of a slip vector is also so constrained that no gap or overlay would be created after the reversal, while the magnitude of the slip vector along the horizon remains constant as long as the fault extends through the entire volume section. If a fault only extends partially through a volume section, the slip vector may be tapered to zero at the tips of the fault.

The displacement or traction vectors at other locations, i.e., vertices, on the contact surface may not generally be known. However, all vertices on the contact surface must additionally satisfy the space constraint, that is, they may not overlap, i.e., cross over, the fault surface. A restricting condition is applied that the fault blocks must not penetrate each other after the restoration. The boundary condition for those points is not an equation but an inequality. To solve the problem of this type, we use the repulsion scheme proposed by Wei and De Bremaecker (see Wei, K. and De Bremaecker, J.-Cl., Fracture Growth Under Compression, Journal of Geophysical Research, 99, 13781-13790, 1994). The basic idea of this scheme is that under an appropriate repulsion or traction stress applied normal to a surface element, the fault sections do not penetrate each other. However, the exact values of the repulsions are not known in advance, but rather, may be iteratively determined, as they will converge on the solution to the inequality. Initially an estimated value of the repulsions or tractions to those points under an inequality constraint is applied. In one example, all normal tractions stresses are set to zero on the first iteration. If a penetration is found at a vertex, the repulsion stress at the corresponding element is incremented. If a gap opening is found at a vertex, the repulsion stress is decremented, in other words, attraction stress is incremented. This scheme is iterative and does converge after several iterations. Thus, with a sufficient traction applied to the fault surface vertices, the space constraint can be iteratively satisfied. In one case, satisfaction of the space constraint requires that no vertex violates the space constraint by an amount greater than a minimum displacement from the fault surface. In one example, a minimum violation of the space constraint is $10^{-2}$ m.

Figure 13:
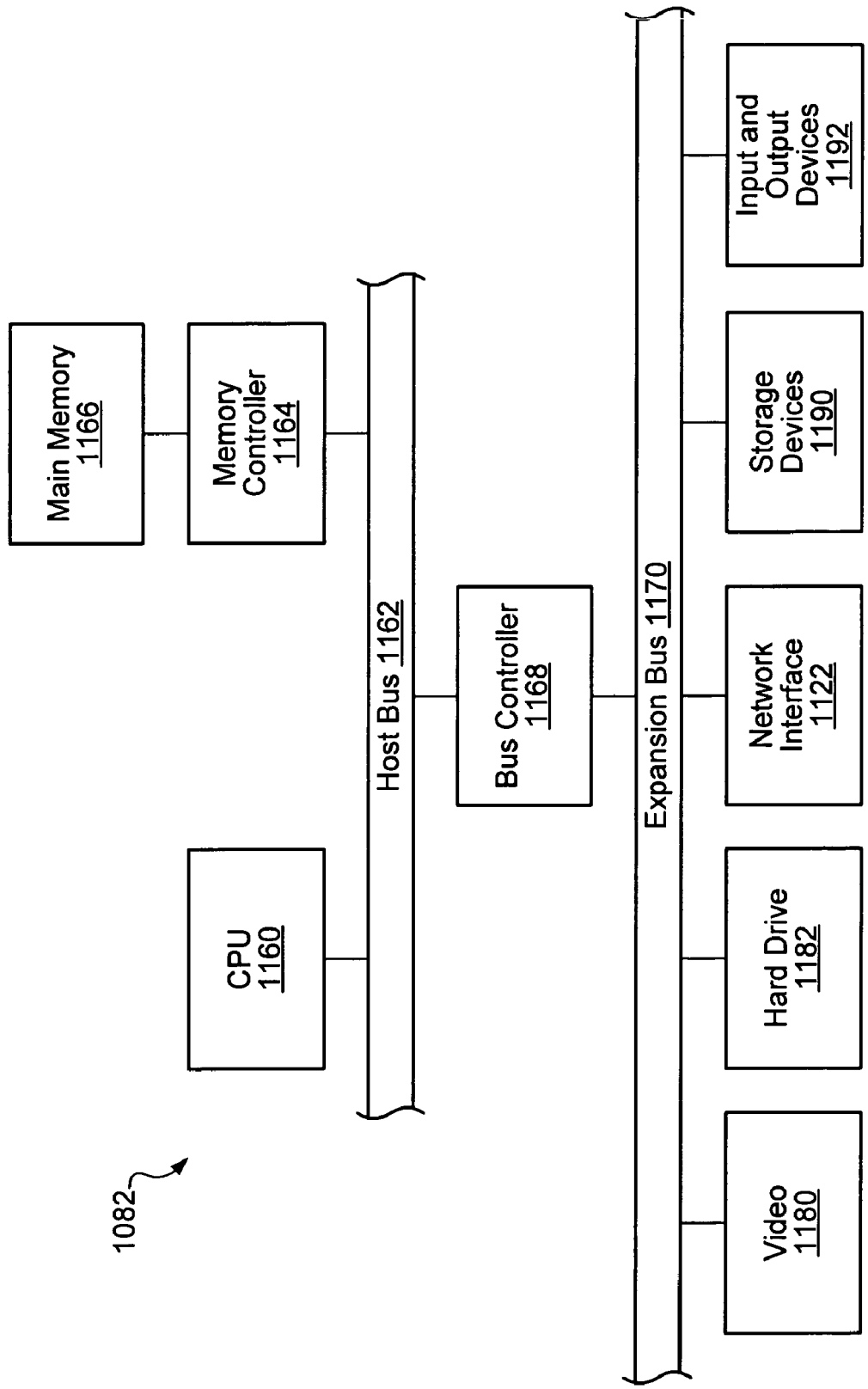
FIG. 13 is a block diagram representing one set of embodiments of a computer system.

FIG. 13 is a block diagram representing one set of embodiments of a computer system 1082 that may take the role of the server computer or the client computer as variously described herein.

The computer system 1082 may include at least one central processing unit CPU 1160 (i.e., processor) that is coupled to a host bus 1162. The CPU 1160 may be any of various types, including, but not limited to, an x86 processor, a PowerPC processor, a CPU from the SPARC family of RISC processors, as well as others. A memory medium, typically including semiconductor RAM, and referred to herein as main memory 1166, may be coupled to the host bus 1162 by means of memory controller 1164. The main memory 1166 may store programs operable to implement any or all or any subset of the various methods embodiments described herein. The main memory may also store operating system software, as well as other software for operation of the computer system.

The host bus 1162 may couple to an expansion or input/output bus 1170 through a bus controller 1168 or bus bridge logic. The expansion bus 1170 may include slots for various devices such as a video card 1180, a hard drive 1182, storage devices 1190 (such as a CD-ROM drive, a tape drive, a floppy drive, etc.) and a network interface 1122. The video card 1180 may couple to a display device such as a monitor, a projector, or a head mounted display. The network interface 1122 (e.g., an Ethernet device) may be used to communicate with other computers through a network. The computer system 1082 may also include I/O devices 1192 such as a mouse, keyboard, speakers.

Embodiments of computer system 1082 targeted for use as a server computer may be more richly endowed with processor capacity (e.g., having multiple processors), memory capacity and network access bandwidth than embodiments targeted for use as a client computer. The client computer may include the mouse, keyboard, speakers and video card (or graphics accelerator), whereas a server computer does not necessarily include these items.

Any method embodiment (or portion thereof) described herein may be implemented in terms of program instructions. The program instructions may be stored on any of various kinds of computer readable memory media. The program instructions are readable and executable (by a computer or set of computers) to implement the method embodiment (or portion thereof).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for reversing a seismic fault represented in a set of seismic data, comprising the steps of:
   receiving seismic data representing a formation volume that contains a fault surface;
   dividing the formation volume into two sections along a separating surface that includes the fault surface, wherein said dividing the formation volume includes specifying a set of geometric elements that cover the boundary of each section;
   receiving input data that specifies slip vectors at selected points on the fault surface;
   computing displacement vectors and traction vectors at vertices of the geometric elements of each section using said input data;
   determining displacement vectors at interior points of each section, wherein said determining a displacement vector at a given interior point of a given section includes numerically evaluating an integral equation over the boundary of the given section using the displacement vectors and the traction vectors at the vertices of the geometric elements covering the boundary of that section, wherein the integral equation is derived from the virtual work principle assuming elastic mechanical properties; and
   generating restored seismic data using the initial seismic data, the displacement vectors at the interior points of each section and the displacement vectors at the vertices of the geometric elements of each section;
   saving, storing, transmitting, or displaying the restored seismic data by a computer.

2. The method of claim 1, wherein said computing displacement vectors and traction vectors at said vertices includes solving a matrix equation to determine a first estimate for the displacement vectors and traction vectors, wherein the matrix equation is derived by restricting the integral equation to said vertices.

3. The method of claim 2, wherein said computing displacement vectors and traction vectors at said vertices also includes:
   determining a gap value for each vertex along the fault surface by calculating the normal distance from the fault surface to the head of the corresponding displacement vector;
   applying perturbations to the estimated traction vectors at vertices along the fault surface, wherein the perturbations are normal to the fault surface and based respectively on the gap values; and
   solving again the matrix equation using the perturbed traction vectors.

4. The method of claim 3, wherein the direction of the perturbation depends on the sign of the gap value.

5. The method of claim 1, wherein the selected points are points along the intersection of the fault surface with one or more horizons in the initial seismic data, wherein the slip vectors are estimates of displacements of the one or more horizons across the fault surface at the selected points.

6. The method of claim 1, wherein the slip vectors are specified by a user.

7. The method of claim 1, wherein the slip vectors are specified by an automated image analysis algorithm operating on the seismic data.

8. The method of claim 1, further comprising: displaying the restored seismic data via a display device.

9. The method of claim 1, wherein at least one seismic horizon is substantially more continuous across the fault surface in the restored seismic data than in the initial seismic data.

10. The method of claim 1, wherein the fault surface is a non-planar surface in 3D space.

11. The method of claim 1, wherein the integral equation corresponding to each section is a boundary integral equation derived using Green's functions applied to the boundary of that section.

12. The method of claim 1, further comprising: repeating said dividing, said receiving input data, said computing, said determining and said generating for a second fault surface in the formation volume.

13. A computer-readable memory medium storing program instructions, wherein the program instructions are computer-executable to:
   receive seismic data representing a formation volume that contains a fault surface;
   divide the formation volume into two sections along a separating surface that includes the fault surface, wherein said dividing the formation volume includes specifying a set of geometric elements that cover the boundary of each section;
   receive input data that specifies slip vectors at selected points on the fault surface;
   compute displacement vectors and traction vectors at vertices of the geometric elements of each section using said input data;
   determine displacement vectors at interior points of each section, wherein said determining a displacement vector at a given interior point of a given section includes numerically evaluating an integral equation over the boundary of the given section using the displacement vectors and the traction vectors at the vertices of the geometric elements covering the boundary of that section, wherein the integral equation is derived from the virtual work principle assuming elastic mechanical properties; and generate restored seismic data using the initial seismic data, the displacement vectors at the interior points of each section and the displacement vectors at the vertices of the geometric elements of each section.

14. The memory medium of claim 13, wherein said computing displacement vectors and traction vectors at said vertices includes:

solving a matrix equation to determine an estimate for the displacement vectors and traction vectors, wherein the matrix equation is derived by restricting the integral equation to said vertices;

applying additional traction stresses at vertices along the fault surface if displacement vectors along the fault surface violate a space constraint, wherein the additional traction stresses are normal to the fault surface;

repeating said solving and said applying a number of times.

15. The memory medium of claim 14, wherein an additional stress at a given vertex is repulsive if the corresponding displacement vector indicates penetration into an opposite section across the fault surface.

16. The memory medium of claim 14, wherein an additional stress is attractive if the corresponding displacement vector indicates a gap between the head of the displacement vector and the fault surface.

17. The memory medium of claim 14, wherein the fault surface remains constant throughout said repeating.

18. The memory medium of claim 13, wherein the selected points are points along the intersection of the fault surface with one or more horizons in the initial seismic data, wherein the slip vectors are estimates of displacements of the one or more horizons across the fault surface at the selected points.

19. The memory medium of claim 13, wherein the slip vectors are specified by a user.

20. The memory medium of claim 13, wherein the slip vectors are specified by an automated image analysis algorithm operating on the seismic data.

21. The memory medium of claim 13, wherein the program instruction are computer-executable to: invoke display the restored seismic data via a display device.

22. The memory medium of claim 13, wherein at least one seismic horizon is substantially less discontinuous across the fault surface in the restored seismic data than in the initial seismic data.

23. The memory medium of claim 13, wherein the fault surface is a non-planar surface in 3D space.

24. The memory medium of claim 13, wherein the integral equation corresponding to each section is a boundary integral equation derived using Green's functions applied to the boundary of that section.

25. The memory medium of claim 13, wherein the program instruction are computer-executable to: repeat said dividing, said receiving input data, said computing, said determining and said generating for a second fault surface in the formation volume.

26. The memory medium of claim 13, wherein the program instruction are computer-executable to: store the restored seismic data in a storage medium.

* * * * *